United States Patent [19]

Schmookler et al.

[11] Patent Number: 5,493,520
[45] Date of Patent: Feb. 20, 1996

[54] TWO STATE LEADING ZERO/ONE ANTICIPATOR (LZA)

[75] Inventors: Martin S. Schmookler; Donald G. Mikan, Jr., both of Austin, Tex.

[73] Assignee: International Business Machines Corporation, Armonk, N.Y.

[21] Appl. No.: 228,323

[22] Filed: Apr. 15, 1994

[51] Int. Cl.$^6$ ........................................... G06F 7/00
[52] U.S. Cl. ................................. 364/715.1; 364/715.04
[58] Field of Search ........................... 364/715.1, 715.04, 364/748

[56] References Cited

U.S. PATENT DOCUMENTS

| | | | |
|---|---|---|---|
| 4,777,613 | 10/1988 | Shahan et al. | 364/748 |
| 4,866,651 | 9/1989 | Bleber et al. | 364/748 |
| 4,926,369 | 5/1990 | Hokenek et al. | 364/748 |
| 4,969,118 | 11/1990 | Montoye et al. | 364/748 |
| 4,979,141 | 12/1990 | Gelinas et al. | 364/748 |
| 5,181,186 | 1/1990 | Al-Ofi | 364/748 |
| 5,204,825 | 4/1990 | Ng | 364/715.04 |
| 5,282,156 | 1/1994 | Miyoshi et al. | 364/715.04 |
| 5,317,527 | 5/1994 | Britton et al. | 364/715.04 |
| 5,343,413 | 8/1994 | Inoue | 364/715.04 |

OTHER PUBLICATIONS

IBM Technical Disclosure Bulletin, vol. 32, No. 4B, Sep. 1989, pp. 393–394, *Unnormalized Number Handling in a Floating–Point Unit Second–Generation RISC Floating Point with Multiply–Add Fused*, 1990 IEEE Journal of Solid–State Circuits, vol. 25, No. 5, Oct. 1990, pp. 1207–1213, Hokenek E et al.

*IBM J. Res. Develop*, Jan. 1990, "Leading–Zero Anticipator (LZA) in the IBM RISC System/6000 Floating–Point Execution Unit", E. Hokenek et al, pp. 71–77.

*Electron. Letters*, UK, Feb. 1993, "Algorithmic Design of a Hierarchical and Modulator Leading Zero Detector Circuit", V. G. Oklobdzija, vol. 29, No. 3, pp. 283–284.

*Primary Examiner*—David H. Malzahn
*Attorney, Agent, or Firm*—Mark E. McBurney; Andrew J. Dillon

[57] ABSTRACT

An apparatus and method for anticipating leading zeros/ones used in normalizing the results of a full adder. The propagate (P), generate (G) and zero (Z) states of the two inputs to the adder are combined in two stages of logic to derive a pair of state outputs L$\phi$S and L1S which fully specify by respective bit strings the leading zero and leading one conditions of the output from the adder. The two state bit strings, one representing the leading zero evaluation and the second representing the leading one evaluation, are then compared to determine which one of the two is applicable, correspondingly indicating whether the adder result is a positive or a negative value, and the number of leading bit positions requiring shifted removal during the normalization process. The leading 0/1 anticipator according to the present invention lends itself to high speed and low device count circuit implementations.

16 Claims, 6 Drawing Sheets

| Bit position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1st Stage | 0 | 0 | 0 | 0 | 1 | 2 | 3 | 4 | 5 | 6 | 7 | 8 | 9 | 10 | 11 | 12 |
|  |  | 1 | 1 | 1 | 2 | 3 | 4 | 5 | 6 | 7 | 8 | 9 | 10 | 11 | 12 | 13 |
|  |  |  | 2 | 2 | 3 | 4 | 5 | 6 | 7 | 8 | 9 | 10 | 11 | 12 | 13 | 14 |
|  |  |  |  | 3 | 4 | 5 | 6 | 7 | 8 | 9 | 10 | 11 | 12 | 13 | 14 | 15 |
| 2nd Stage |  |  |  |  | 0 | 1 | 2 | 3 | 0 | 1 | 2 | 3 | 0 | 1 | 2 | 3 |
|  |  |  |  |  | 4 | 5 | 6 | 7 | 4 | 5 | 6 | 7 | 4 | 5 | 6 | 7 |
|  |  |  |  |  |  |  |  |  | 8 | 9 | 10 | 11 | 8 | 9 | 10 | 11 |
|  |  |  |  |  |  |  |  |  |  |  |  |  | 12 | 13 | 14 | 15 |

FIG. 11

TWO STATE LEADING ZERO/ONE ANTICIPATOR (LZA)

CROSS-REFERENCE TO RELATED APPLICATIONS

The present invention is related to the invention in U.S. patent application Ser. No. 08/161,361, filed Dec. 6, 1993, under the title "Result Normalizer and Method of Operation" now U.S. Pat. No. 5,392,228.

FIELD OF THE INVENTION

The present invention relates generally to digital computers. More particularly, the invention is directed to systems and methods for anticipating leading zeros or ones as is commonly practiced in floating point execution units.

BACKGROUND OF THE INVENTION

The technology of floating point execution units (processors) has undergone tremendous improvement in the preceding ten years. This evolution coincides with the growth of reduced instruction set computing (RISC) data processing architectures. An example of a contemporary floating point processor architecture appears in the RISC System/6000 workstation as commercially sold by IBM Corporation. Many related floating point processor concepts are described in U.S. Pat. No. 4,969,118, the subject matter of which is incorporated herein by reference.

Whereas prior floating point processors expended 30–50 clock cycles to complete a floating point mathematical operation, contemporary RISC designs perform the same mathematical operation, with mantissa bit counts of 32 or greater, in five clock cycles or less.

Normalization is the removal of leading zeros or ones for respective positive or negative outputs of the full adder conventionally used to perform the floating point operations. The determination of how many leading zeros or leading ones need to be removed is preferably accomplished in parallel with the operations in the full adder. Such concurrency is important since even a few clock cycles now have a major performance impact on the composite speed of the floating point processor.

In pursuit of this need for parallel operation, leading 0/1 "detector" devices formerly used with floating point processors were replaced by leading 0/1 "anticipator" architectures and circuits. An example of such leading 0/1 anticipator architecture appears in U.S. Pat. No. 4,926,369, the subject matter of which is incorporated herein by reference, and is further developed in the article by Hokenek, et al entitled "Second-Generation RISC Floating Point with Multiply-Add Fused" as published in the IEEE Journal of Solid-State Circuits, Volume 25, No. 5, October, 1990 at pages 1207–1213. The objective of the leading 0/1 anticipator (LZA) is to minimize the normalization delay following an output from the full adder. The ideal situation is to have available for immediate use the leading 0/1 shift adjustment when the mantissa value becomes available from the full adder. This allows immediate normalization of the mantissa by shifts to the left to remove, as appropriate, either the leading zeros or the leading ones depending upon the sign of the adder output.

Although the architecture described in U.S. Pat. No. 4,926,369 proved to be a tremendous improvement over the then existing designs, that architecture required the generation, and the eventual logical combination, of five separate strings of variables (state outputs) from the two input data bit strings presented to the full adder. The five bit strings representing the states are designated ZZ, PP, PZ, PG and GG. The generation of the logical combinations PZ and PG require both logical AND and logical OR stages, extending the number of successive gates and precluding the use of single rail high speed logic. Furthermore, the presence of five strings of variables require that each bit in a string be a function of all higher order bits (all bits to the left of it), create the needs for logic circuits with significant FAN-IN and FAN-OUT loading. As a consequence, the logic needed to implement the five state design was not readily amenable to reductions in size or increases in speed.

The leading 0/1 anticipation architectures and circuits as defined in such teachings were a significant improvement over their predecessors but have proven to be slow and complex in relation to the needs of contemporary floating point processors.

SUMMARY OF THE INVENTION

In one form, the invention is directed to a leading 0/1 anticipator apparatus used with an adder of a digital processor, the adder receiving inputs of first and second data bit strings, which apparatus comprises a means for identifying leading zeros in a bit string generated by a logical combination of the P and Z bit strings derived from the first and second data bit strings, and means for identifying leading ones in a bit string generated by a logical combination of the P and G bit strings derived from the first and second data bit strings. In variations of the basic invention, the bit strings are combined through the use of specific logic functions individually for leading zero and one consideration, and in a further form by comparison of bit strings related to leading zeros and bit strings related to leading ones. In yet further forms, the invention is directed to methods of using the apparatus to anticipate leading 0/1 bits as provided in the aforementioned apparatus.

According to a preferred embodiment of the leading zero anticipator apparatus, the first and second data bit strings input to the adder are characterized in terms of P, Z and G bit strings, and upon selective combination of the P and Z bit strings, as one set, and the P and G strings, as a second set, define two sets of concluding bit strings respectively conveying leading zero and leading one elimination information. The leading zero and leading one elimination information is preferably extracted from such pairs of input data bit strings by first combining through exclusive OR (XOR) gates and then logically evaluating in progression from the most significant bit position all previous combinations using AND logic. The outcome of the comparisons provide respectfully the actual locations of the first zero and one bit positions as will appear in the mantissa sum from the full adder. The sign of the result and selection of zero or one elimination is readily determined by comparing the two bit strings through OR logic.

The leading zero anticipator apparatus and method as defined by the present invention reduces from 5 to 2 the number of bit strings generated from the Z, P and G comparisons, and evaluates the leading zeros and leading ones concurrently. Furthermore, the architecture uses fewer logic stages, a circuit arrangement which is amenable to efficient negative logic implementation using CMOS devices with reasonable FAN-IN and FAN-OUT capabilities.

These and other benefits of the invention will become apparent upon considering the detailed description which is set forth hereinafter.

DESCRIPTION OF THE PREFERRED EMBODIMENT

Figure 1:
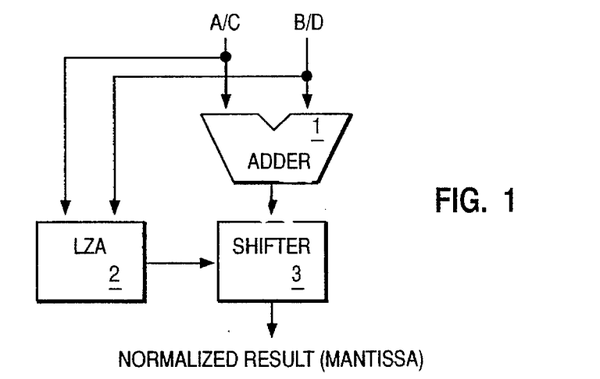
FIG. 1 is a schematic block diagram depicting the location of the leading zero anticipator (LZA) in the context of a processor.

FIG. 1 depicts a preferred embodiment of the present invention. The objective of the invention is to anticipate for removal during normalization the leading zeros, or leading ones for negative numbers, generated in the output of a full adder. In the embodiment of FIG. 1, full adder 1 is the concluding stage of a floating point processor calculating the mantissa of a multiply-add fuse calculation analogous to that performed in the aforementioned IEEE Journal article and U.S. Pat. No. 4,969,118. As presently embodied, leading zero/one anticipator (LZA) 2 operates in parallel with the clocked operation of adder 1 to determine the number of bit positions shifter 3 must introduce to normalize the resulting mantissa of the floating point number. A preferred normalization, as distinct from the LZA operation, is described in the aforementioned U.S. patent application Ser. No. 08/161,361, the subject matter of which is incorporated herein by reference.

The operation of the present LZA will be described by way of two examples, the first representing an addition of two numbers, A and B, having a positive value sum, and a second example involving numbers C and D having a negative value sum. The addition of A and B is described by way of Tables I–III, while the summation of C and D is described with reference to Tables IV–VI. It should be noted that the leading zero evaluations and leading one evaluations as illustrated in their respective Tables of I, II, IV and V are done concurrently, and thereafter logically combined for selection as illustrated in Tables III and VI. The output of the present invention provides in a digital computer format both the number of leading zeros, or leading ones, and correspondingly the sign of the full adder result.

TABLE I (LEADING ZERO EVALUATION)

```
                    MSB                       LSB
                   (P P P P G Z Z Z Z G Z Z)
         A:        0 0 0 0 1 0 0 0 0 1 0 0
         B:        1 1 1 1 1 0 0 0 0 1 0 0
      all 1s:      1 1 1 1 1 1 1 1 1 1 1 1 sums:        0 0 0 0 1 1 1 1 1 1 1 1
      (by bit)
      carries:     1 1 1 1 0 0 0 0 1 0 0 0
      XORs:        1 1 1 1 1 1 1 1 0 1 1 1
AND by bit-
position starting: 1 1 1 1 1 1 1 1 0 0 0 0  <<< LφS
with the MSB
   actual sum
   of A & B:       0 0 0 0 0 0 0 1 0 0 0   a positive
                             with a carry   number with
                                            8 leading
                                            zeros
```

$sum_i = \overline{A_i \text{ XOR } B_i} = \bar{P}_i$ $carry_i = A_{i+1} \text{ OR } B_{i+1} = \bar{Z}_{i+1}$ $XOR_i = \bar{P}_i \text{ XOR } \bar{Z}_{i+1} = P_i \text{ XOR } Z_{i+1} = PZ_i$ $L\phi S_i = PZ_1 \text{ AND } PZ_2 \text{ AND } PZ_3 \ldots \text{ AND } PZ_i$

TABLE II (LEADING ONE EVALUATION)

```
                    MSB                     LSB
                   (P P P P G Z Z Z Z G Z Z)
         A:        0 0 0 0 1 0 0 0 0 1 0 0
         B:        1 1 1 1 1 0 0 0 0 1 0 0
      all 0s:      0 0 0 0 0 0 0 0 0 0 0 0 sums:        1 1 1 1 0 0 0 0 0 0 0 0
      (by bit)
      carries:     0 0 0 1 0 0 0 0 1 0 0 0
      XORs:        1 1 1 0 0 0 0 0 1 0 0 0
AND by bit-
position starting: 1 1 1 0 0 0 0 0 0 0 0 0  <<< L1S
with the MSB
```

$sum_i = A_i \text{ XOR } B_i = P_i$ $carry_i = A_{i+1} \text{ AND } B_{i+1} = G_{i+1}$ $XOR_i = P_i \text{ XOR } G_{i+1} = PG_i$ $L1S_i = PG_1 \text{ AND } PG_2 \text{ AND } PG_3 \ldots \text{ AND } PG_i$

TABLE III (COMBINE)

```
                  (P P P P G Z Z Z Z G Z Z)
   LφS       :     1 1 1 1 1 1 1 1 0 0 0 0
  (TABLE I)

L1S       :     1 1 1 0 0 0 0 0 0 0 0 0      (1)
  (TABLE II)

ORing     :     1 1 1 1 1 1 1 1 0 0 0 0
                                               (2)
```

TABLE III-continued (COMBINE)

| | |
|---|---|
| RESULT | (1) The match identifies that "leading zero" elimination applies.<br>(2) The normalization should remove 8 leading zeros. |

TABLE IV (LEADING ZERO EVALUATION)

|  | MSB | | | | | | | | | | LSB | |
|---|---|---|---|---|---|---|---|---|---|---|---|---|
|  | (P | P | P | P | Z | G | G | G | G | Z | G | G) |
| C: | 0 | 0 | 0 | 0 | 0 | 1 | 1 | 1 | 1 | 0 | 1 | 1 |
| D: | 1 | 1 | 1 | 1 | 0 | 1 | 1 | 1 | 1 | 0 | 1 | 1 |
| all 1s: | 1 | 1 | 1 | 1 | 1 | 1 | 1 | 1 | 1 | 1 | 1 | 1 |
| sums: (by bit) | 0 | 0 | 0 | 0 | 1 | 1 | 1 | 1 | 1 | 1 | 1 | 1 |
| carries: | 1 | 1 | 1 | 0 | 1 | 1 | 1 | 1 | 0 | 1 | 1 | 0 |
| XORs: | 1 | 1 | 1 | 0 | 0 | 0 | 0 | 0 | 1 | 0 | 0 | 1 |
| AND by bit-position starting with the MSB: | 1 | 1 | 1 | 0 | 0 | 0 | 0 | 0 | 0 | 0 | 0 | 0 <<< L$\phi$S |
| actual sum of C & D: | 1 | 1 | 1 | 1 | 1 | 1 | 1 | 1 | 0 | 1 | 1 | 0 a negative number with 8 leading ones |

$sum_i = \overline{C_i \ XOR \ D_i} = \bar{P}_i$ $carry_i = C_{i+1} \ OR \ D_{i+1} = \bar{Z}_{i+1}$ $XOR_i = \bar{P}_i \ XOR \ \bar{Z}_{i+1} = P_i \ XOR \ Z_{i+1} = PZ_i$ $L\phi S_i = PZ_1 \ AND \ PZ_2 \ AND \ PZ_3 \ldots AND \ PZ_i$

TABLE V (LEADING ONE EVALUATION)

|  | MSB | | | | | | | | | | LSB | |
|---|---|---|---|---|---|---|---|---|---|---|---|---|
|  | (P | P | P | P | Z | G | G | G | G | Z | G | G) |
| C: | 0 | 0 | 0 | 0 | 0 | 1 | 1 | 1 | 1 | 0 | 1 | 1 |
| D: | 1 | 1 | 1 | 1 | 0 | 1 | 1 | 1 | 1 | 0 | 1 | 1 |
| all 0s: | 0 | 0 | 0 | 0 | 0 | 0 | 0 | 0 | 0 | 0 | 0 | 0 |
| sums: (by bit) | 1 | 1 | 1 | 1 | 0 | 0 | 0 | 0 | 0 | 0 | 0 | 0 |
| carries: | 0 | 0 | 0 | 0 | 1 | 1 | 1 | 1 | 0 | 1 | 1 | 0 |
| XORs: | 1 | 1 | 1 | 1 | 1 | 1 | 1 | 1 | 0 | 1 | 1 | 0 |
| AND by bit-position starting with the MSB: | 1 | 1 | 1 | 1 | 1 | 1 | 1 | 1 | 0 | 0 | 0 | 0 <<< L1S |

$sum_i = C_i \ XOR \ D_i = P_i$ $carry_i = C_{i+1} \ AND \ D_{i+1} = G_{i+1}$ $XOR_i = P_i \ XOR \ G_{i+1} = PG_i$ $L1S_i = PG_1 \ AND \ PG_2 \ AND \ PG_3 \ldots AND \ PG_i$

TABLE VI (COMBINE)

|  | (P P P P Z G G G G Z G G) |
|---|---|
| L$\phi$S (TABLE IV) : | 1 1 1 0 0 0 0 0 0 0 0 0 |
| L1S (TABLE V) : | 1 1 1 1 1 1 1 1 0 0 0 0 (1) |
| ORing : | 1 1 1 1 1 1 1 1 0 0 0 0 |
|  | (2) |
| RESULT | (1) The match identifies that "leading one" elimination applies.<br>(2) The normalization should remove 8 leading ones. |

Turning to Table I, the objective at this stage is to evaluate the A and B data strings provided as inputs to the adder. The A and B bit strings are presented as are the positions of the most significant bit (MSB) and least significant bit (LSB). Likewise, the propagate (P), generate (G) and zero (Z) states corresponding to the values A and B appear by respective columns in association with the bit positions. Toward the bottom of the table the actual binary sum of A and B is shown by bit string to be a positive number with a single one in the fourth bit position from the right and a string of eight leading zeros. The objective is to optimize the logical determination of the fact that there are eight leading zeros and that the sum value is positive.

The preferred apparatus and method of practice as illustrated with reference to Table I involves the logical summation of the bit strings A and B with a bit string composed of all ones, and the individualized generation of a bit string representing the sums at individual bit positions and the carries corresponding for such individual bit positions. The corresponding mathematical equations for the sum and carry bit strings appear in the lower part of the table. Also shown in Table I is the exclusive OR (XOR) combination of the sum and carry bit strings by bit position. The concluding operation, which generates the first, L$\phi$S, of the two state outputs, represents a logical AND combination increasing incrementally by bit position from the most significant bit using the XOR bit string as the input. Though at this stage the apparatus and method have identified the number of leading zeros, the concurrent evaluation of leading ones, and relative comparison of the two evaluations, must also be performed.

Table II illustrates an analogous evaluation of the leading ones. Note in this case that the sum and carry results by bit position involve the addition of A and B with a bit string of all zeros. Again the XOR results of the sums and carries by bit position are incrementally evaluated by a logical AND to generate the L1S bit string, representing the second state output. Note that this bit string is composed of ones in the three most significant bit positions, specifying for purposes of leading one evaluation that the three most significant bits are leading ones. The logical operations depicted in Table III represent a comparison of the leading zero bit string and the leading one bit string, the two state outputs, L$\phi$S and L1S, to select the prevailing result of the two and thereby correspondingly determine whether to delete by shifting based upon one or the other state outputs during normalization. This outcome also indicates the sign of the results.

Table III shows the two state output bit strings, L$\phi$S and L1S, from Table I and II. The two bit strings are subject to a logical OR by bit position to generate a concluding bit string. The concluding bit string in Table III identifies by match (1) to the L$\phi$S bit string that leading zero elimination applies, that the result of the adder is to be a positive number, and lastly that the normalization must remove eight leading zeros (2).

The second example as depicted in the succession of Tables IV–VI illustrates a situation in which the sum from the adder is a negative value. In this example, the adder receives as inputs data bit strings C and D, where the D bit string is shown to be a large negative value so as to produce a sum of C and D which is also negative. The actual sum of C and D appears near the bottom of Table IV. The procedures as described earlier with reference to Table I are applied during the leading zero evaluation performed in Table IV. A corresponding practice occurs in Table V, where leading one evaluation proceeds analogous to that previously described in detail with reference to Table II. The two state output results, L$\phi$S and L1S, from Tables IV and V are compared in Table VI. Note in this case that the outcome of the logical OR matches (1) the leading one result L1S, indicating that leading one elimination applies, that the result of adding A and B is negative, and that eight leading ones (2) need to be removed during normalization.

The mathematical relationships between the various bit strings used to generate a state output bit string representing the leading zeros appear at the bottom of Table I. Therefore, the sum bit for position i is equal to the complement of the XOR combination of the corresponding bit positions in data bit strings A and B, and is likewise equal to the inverse of the propagate for that bit position. Similarly, the carry for a bit position is equal to the logical OR combination of the values for A and B in the adjacent bit position to the right and is further equal to the inverse of the zero state for such adjacent bit position. The XOR bit string in Table I is equal to the XOR combination of the inverse P for a select bit position and the inverse Z for the next successive bit position. The values are designated $PZ_i$. The state output L$\phi S_i$ is the outcome of a logical AND combination, including for each bit position the corresponding result from all more significant bit positions as applied to the XOR bit string.

The mathematical relationships set forth at the bottom of Table II show that the sum for a bit position corresponds to the XOR combination of the A and B values at the same position, and is further equal to a propagate (P) for that bit position. The carry for a bit position is equal to the logical AND combination of the values for A and B for the next successive bit position, and is further equal to generate (G) for that next adjacent bit position. The XOR value for each bit position is equal to the XOR combination of the propagate (P) for that bit position and generate (G) for the next successive bit position, which is also defined to be the second of the states as represented by the bit strings. These values are designated $PG_i$.

The bit strings A and B, having a positive result, and the bit strings C and D, having a negative result, are a superset of possible P, G and Z combinations. Accordingly, they illustrate the viability of the present implementation encompassing the full spectrum of bit combinations which might occur as inputs to the adder.

The fundamental leading zero and leading one information is conveyed completely through the two state output bit streams, L$\phi$S and L1S. L$\phi$S characterizes the location of leading zeros. A similar situation exists for the state represented by bit steam L1S for purposes of leading ones.

Leading 0/1 anticipation, whether practiced according to the present invention or in keeping with the aforementioned LZA prior art, is susceptible to a count shortfall of one bit position. This is attributable to the fact that the LZA evaluation is done by an evaluation performed from the MSB positions of the data bit strings input to the adder. On limited occasions, and with specific P, G and Z combinations a carry input to the adder, entering mathematically from the right side of bit strings, will cause the LZA count to be one bit position short. A preferable solution is to have the normalization system check the leading bit for an additional 0/1, as appropriate, after the completion of the normalization shift as specified by the LZA.

Figure 2:
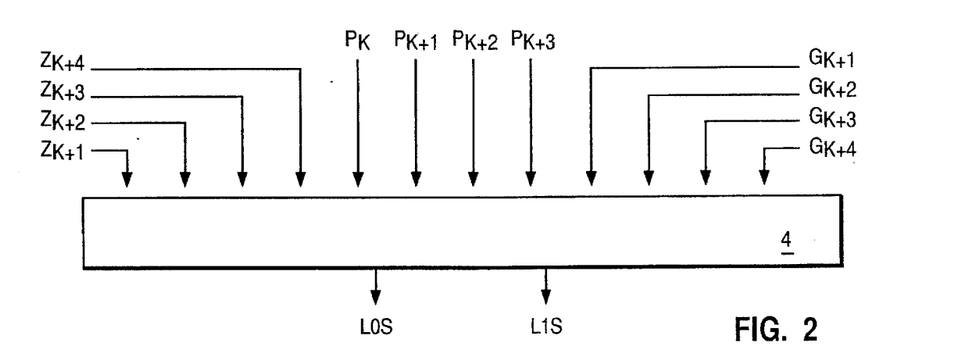
FIG. 2 is a schematic block diagram depicting the Z, P and G elements used to generate the leading zero and leading one bit strings characterizing the respective positions of the leading zeros and leading ones in the mantissa from the adder of the processor.

The generation of the two state bit strings which characterize the leading zeros and leading ones is functionally depicted by block 4 in FIG. 2. Note that the bit positions of the Z and G inputs are shifted one place with respect to the P input. This relative shift of the Z and G positions corresponds to the mathematical relationships set forth in Tables I and II characterizing the generation of the $PZ_i$ and $PG_i$ values.

Figure 3:
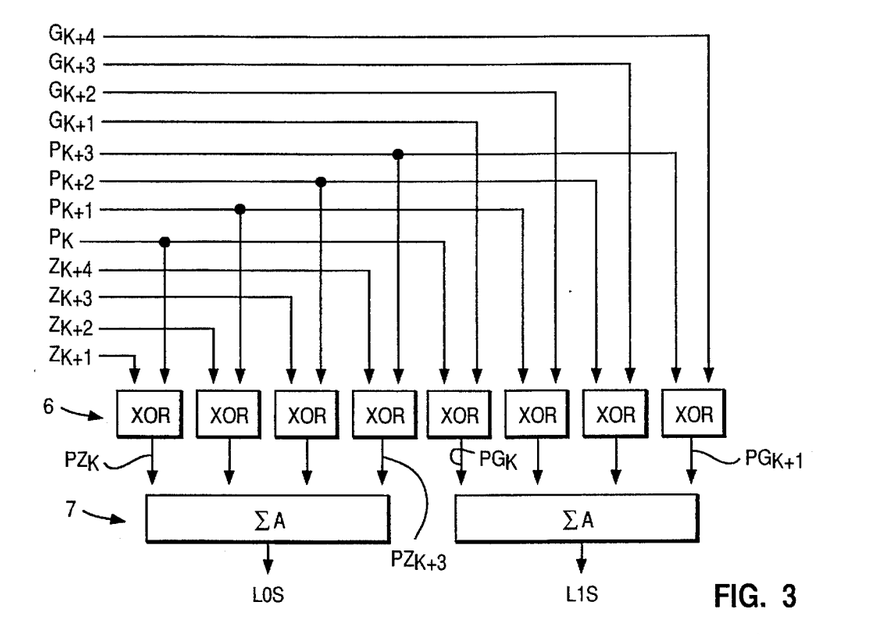
FIG. 3 is a schematic block diagram of the logic within the block of FIG. 2 as applied to a system with multiple adder input bits.
Figure 4:
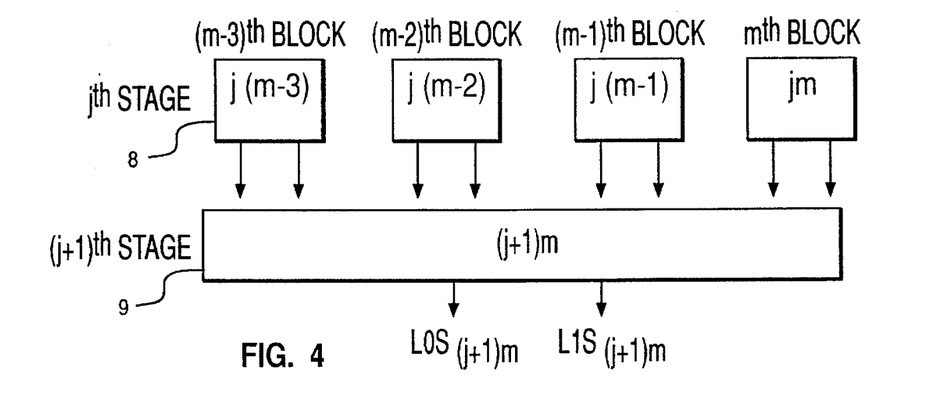
FIG. 4 is a schematic block diagram of the logic internal to the summing AND block in FIG. 3.
Figure 5:
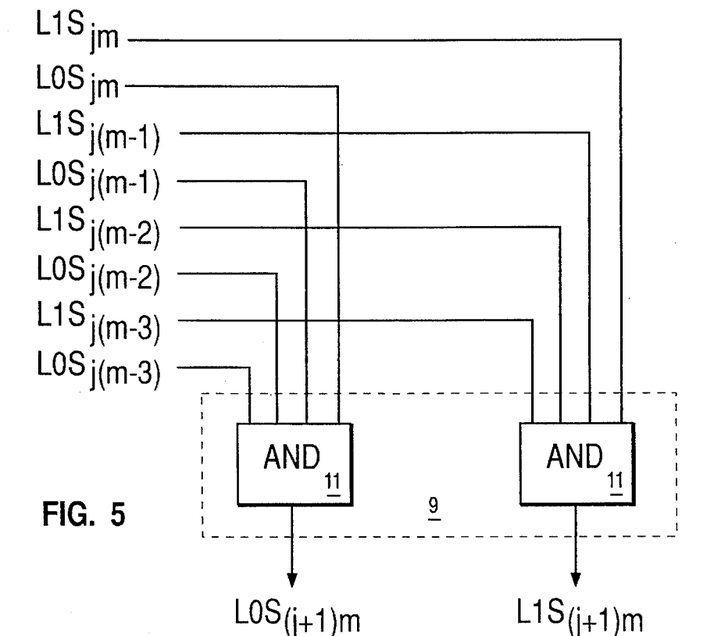
FIG. 5 is a schematic block diagram of the logic internal to the blocks in FIG. 4.

FIG. 3 illustrates through the use of conventional XOR blocks 6 and incrementally summing AND blocks 7 the actual functional elements internal to block 4 in FIG. 2. Note that state outputs L$\phi$S and L1S convey the results of the leading zero and leading one evaluations. Since AND blocks 7 require incrementally increasing combinations of bits, starting from the most significant bit position, to derive an output state for each respective bit in the L$\phi$S or L1S bit string, FAN-OUT and FAN-IN considerations become important. FIG. 4 illustrates a conventional implementation of the AND functions in blocks 7 of FIG. 3 using successive stages with each successive stage block 8 and 9 consisting of the convention AND blocks 11 as depicted in FIG. 5.

Figure 6:
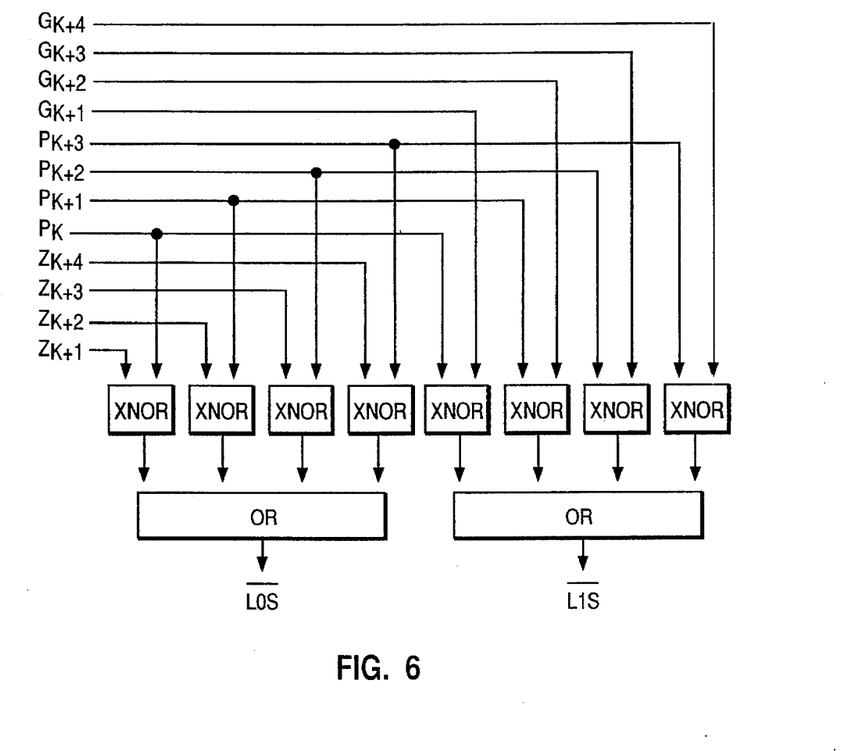
FIG. 6 is a schematic block diagram showing the implementation of FIG. 3 using logic block from FIGS. 7, 8 and 9.
Figure 7:
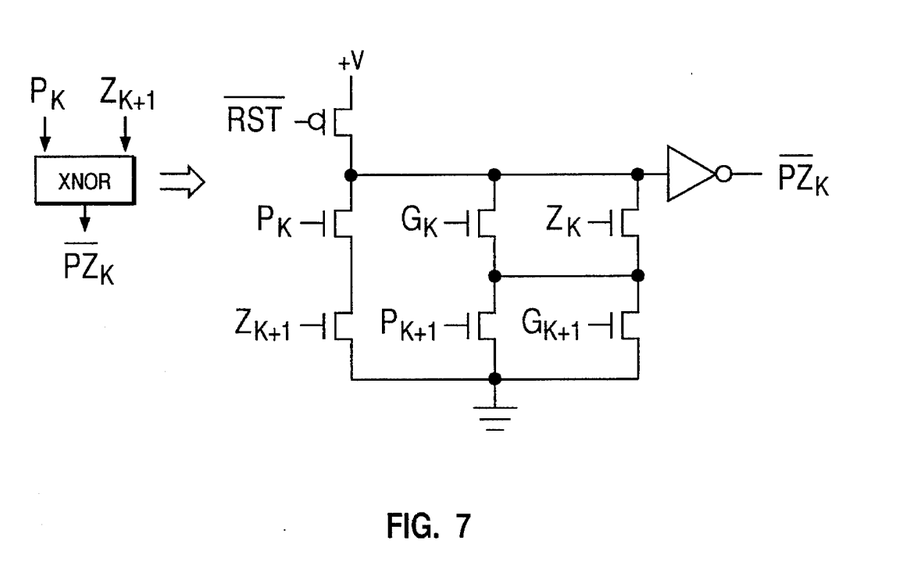
FIGS. 7, 8 and 9 are schematics illustrating the correspondence between preferred logic blocks and efficient CMOS integrated circuit implementations.
Figure 8:
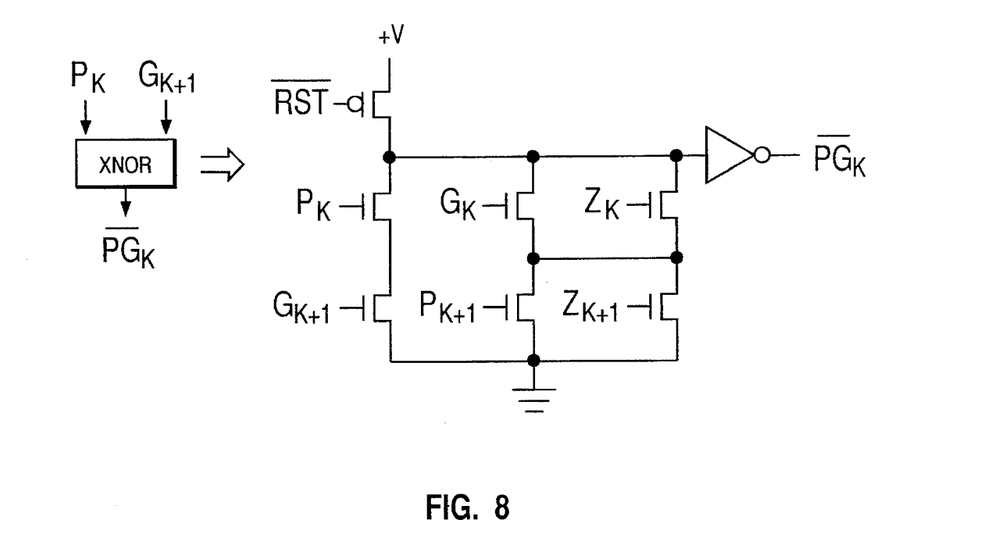
Figure 9:
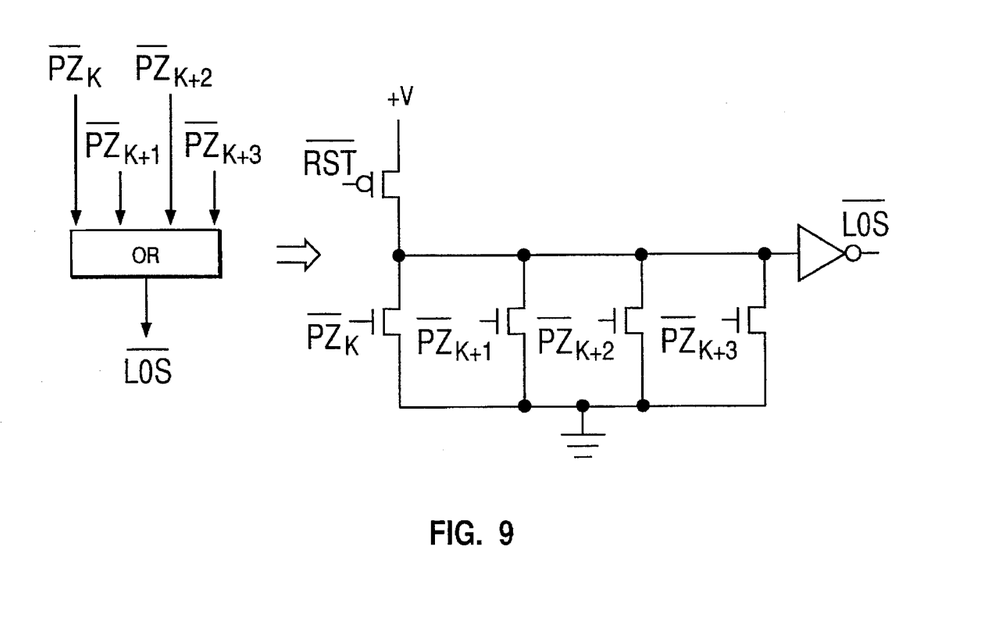

The existence of only two logic stages between the P, G and Z inputs, and the two state output bit strings representing the results of the leading zero and leading one evaluations, is desirable not only from direct minimization of the number of successive clocked gates but it also allows Boolean logic manipulation for faster and more efficient circuit designs. In this regard, it is apparent that the use of the extended AND blocks 7 (FIGS. 3 and 4) introduces delays in the numerous stages and exhibits undesirable FAN-IN and FAN-OUT loading effects. In contrast, the Boolean equivalent in FIG. 6 use XNOR and OR gates with fewer stages and loading problems. Furthermore, the use of XNOR and OR gates permits the use of single rail negative polarity CMOS configurations which are faster and have greater FAN-IN and FAN-OUT capabilities. FIG. 7, 8 and 9 depict circuits which functionally replicate the XNOR and OR functions defined in the preferred practice of the present invention.

Figure 10:
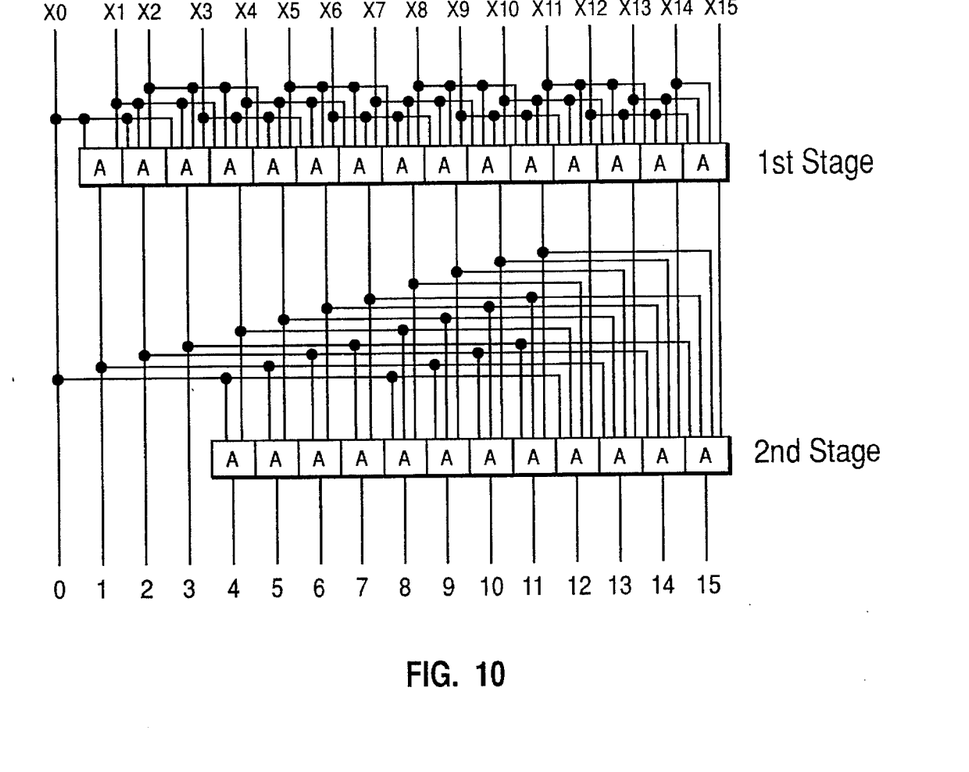
FIG. 10 is a schematic block diagram illustrating an efficient implementation of AND logic in FIG. 3.
Figure 11:
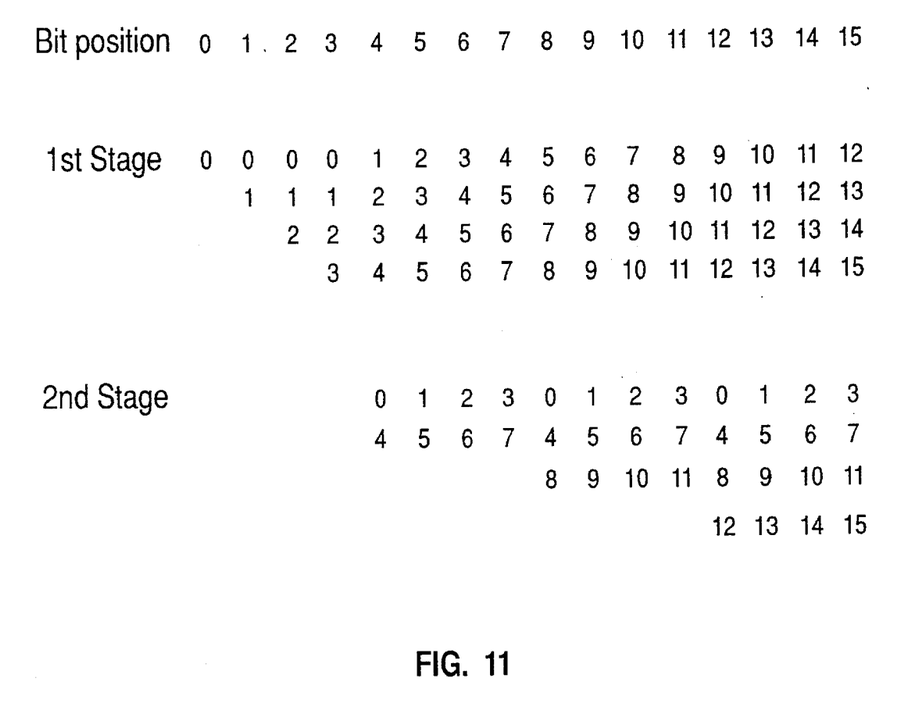
FIG. 11 contains a symbolic representation of the logic depicted in FIG. 10.

In another aspect the invention also provides, by way of an alternate embodiment, a better implementation of AND block 7 (FIG. 3) which somewhat mitigates the loading effects and stage count. A representative configuration of such AND implementation for 16 bits appears in FIG. 10. The corresponding symbolic representation is shown in FIG. 11. Note that this AND architecture provides the needed bit-wise cumulatively increasing AND function with a maximum FAN-IN of 4 at any AND gate and accomplishes the overall function in only two stages.

Figure 12:
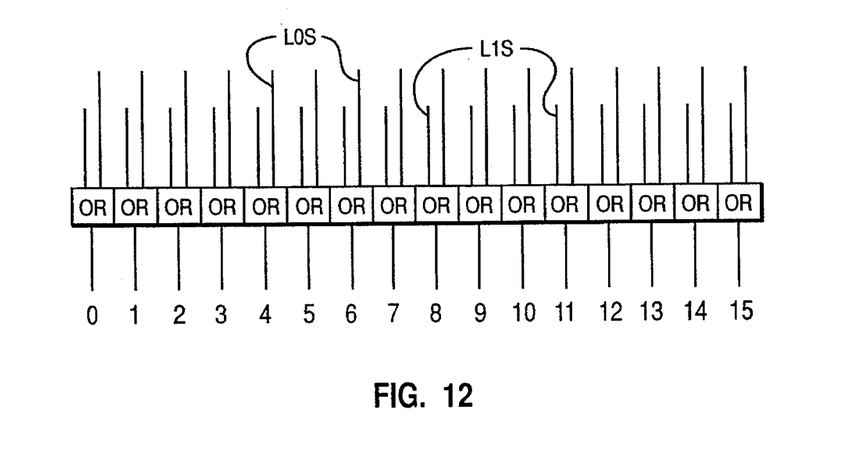
FIG. 12 is a schematic block diagram of the OR logic used to compare L0S and L1S for applicability during normalization.

FIG. 12 depicts a representative set of OR gates for accomplishing the combination operations described with reference to Tables III and VI. Namely these tables depict the OR combination of L$\phi$S and L1S to determine by subsequent matching whether leading zero or leading one elimination applies.

The present invention thereby provides apparatus and methods by which leading zero/one bits are detected in anticipation of an actual result from an adder with fewer logic stages and with logic functions which are amenable to efficient size and speed circuit implementation.

Though the invention has been described and illustrated by way of specific embodiments, the apparatus and methods encompassed by the invention should be interpreted in keeping with the breadth of the claims set forth hereinafter.

We claim:

1. A leading digit anticipator apparatus utilized in conjunction with an adder of a digital processor, said adder receiving as inputs first and second data bit streams, comprising:

means for logically combining said first and said second data bit strings to derive P, Z, and G bit strings, wherein each bit position within said P bit string is derived by XORing corresponding bit positions of said first and second data bit strings, and wherein each bit position within said Z bit string is derived by ORing corresponding bit positions of said first and second data bit strings, and wherein each bit position within said G bit string is derived by ANDing corresponding bit positions within said first and second data bit strings;

means for logically combining said P and Z bit strings to derive a PZ bit string and for logically combining said P and G bit strings to derive a PG bit string;

means for determining from said PZ bit string a possible number of leading zeros within a sum of said first and second data bit strings; and means for determining from said PG bit string a possible number of leading ones within a sum of said first and second data bit strings, wherein a number of leading zeros or ones within a sum is efficiently determined.

2. The leading digit anticipator apparatus recited in claim 1, wherein said means for determining from said PZ bit string a possible number of leading zeros comprises means for constructing a first state output bit stream, wherein a value of each bit position within said first state output bit stream is determined, beginning with a most significant bit position, by combining a value of each corresponding bit position within said PZ bit string with values of more significant bit positions within said PZ bit string.

3. The leading digit anticipator apparatus recited in claim 2, wherein said means for constructing a first output bit string combines a value of each bit position within said PZ bit string with values of more significant bit position utilizing multiple AND gates.

4. The leading digit anticipator apparatus recited in claim 1, wherein said means for determining from said PG bit string a possible number of leading ones comprises constructing a second state output bit stream, wherein a value of each bit position within said second state output bit stream is determined, beginning with a most significant bit position, by combining the value of each corresponding bit position within said PG bit string with values of more significant bit positions within said PG bit string.

5. The leading digit anticipator apparatus recited in claim 4, wherein said means for constructing a second output bit string combines a value of each bit position within said PG bit string with the values of more significant bit positions utilizing multiple AND gates.

6. The leading digit anticipator apparatus recited in claim 1, wherein said means for logically combining said P and Z bit strings and for logically combining said P and G bit strings logically combines said P and Z bit strings and logically combines said P and G bit strings utilizing exclusive-OR (XOR) logic.

7. The leading digit anticipator apparatus recited in claim 1, wherein said means for determining from said PZ bit string a possible number of leading zeros has as an output a first state output bit string, said first output bit string indicating said possible number of leading zeros by having a corresponding number of leading bit positions set to a particular bit state, and wherein said means for determining from said PG bit string a possible number of leading ones has as an output a second state output bit string, said second output bit string indicating said possible number of leading ones by having a corresponding number of leading bit positions set to a particular bit state.

8. The leading digit anticipator apparatus recited in claim 7, and further comprising:

means for logically combining said first state output bit string and said second state output bit string to derive a matching bit string; and means for comparing said matching bit string to said first and said second state output bit strings to determine a sign of said sum of said first and second data bit strings and a number of leading zeros or ones within said sum, wherein said sign of said sum is positive if said matching bit string corresponds to said first state output bit string and is negative if said matching bit string corresponds to said second state output bit string.

9. A method within a digital processor for anticipating leading digits within a sum of an adder, said adder receiving as inputs first and second data bit strings, said method comprising:

logically combining said first and said second data bit strings to derive P, Z, and G bit strings, wherein each bit position within said P bit string is derived by XORing corresponding bit positions of said first and second data bit strings, and wherein each bit position within said Z bit string is derived by ORing corresponding bit positions of said first and second data bit strings, and wherein each bit position within said G bit string is derived by ANDing corresponding bit positions within said first and second data bit strings;

logically combining said P and Z bit strings to derive a PZ bit string;

logically combining said P and G bit strings to derive a PG bit string;

determining from said PZ bit string a possible number of leading zeros within a sum of said first and second data bit strings; and determining from said PG bit string a possible number of leading ones within a sum of said first and second data bit strings, wherein a number of leading zeros or ones within a sum is efficiently determined.

10. The method for anticipating leading digits of claim 9, wherein said step of determining from said PZ bit string a possible number of leading zeros comprises:

constructing a first state output bit stream, wherein a value of each bit position within said first state output bit stream is determined, beginning with a most significant bit position, by combining a value of each corresponding bit position within said PZ bit string with values of more significant bit positions within said PZ bit string.

11. The method for anticipating leading digits of claim 10, wherein said step of constructing a first state output bit stream comprises:

beginning with a most significant bit position, ANDing a value of each bit position within said PZ bit string with values of more significant bit positions.

12. The method for anticipating leading digits of claim 9, wherein said step of determining from said PG bit string a possible number of leading ones comprises:

constructing a second state output bit string, wherein a value of each bit position within said second state output bit string is determined, beginning with a most significant bit position, by combining a value of each corresponding bit position within said PG bit string with values of more significant bit positions within said PG bit string.

13. The method for anticipating leading digits of claim 12, wherein said step of constructing a second state output bit stream comprises:

beginning with a most significant bit position, ANDing a value of each bit position within said PG bit string with values of more significant bit positions.

14. The method for anticipating leading digits of claim 9, wherein said steps of logically combining said P and Z bit strings and logically combining said P and G bit strings comprise:

logically combining said P and Z bit strings and logically combining said P and G bit strings utilizing exclusive-OR (XOR) logic.

15. The method for anticipating leading digits of claim 9, wherein said step of determining from said PZ bit string a possible number of leading zeros has as an output a first state output bit string, said first state output bit string indicating said possible number of leading zeros by having a corresponding number of leading bit positions set to a particular bit state, and wherein said step of determining from said PG bit string a possible number of leading ones has as an output a second state output bit string, said second state output bit string indicating said possible number of leading ones by having a corresponding number of leading bit positions set to a particular bit state.

16. The method for anticipating leading digits of claim 15, and further comprising:

logically combining said first and said second state output bit strings to derive a matching bit string;

comparing said matching bit string to said first and said second state output bit strings to determine a sign of said sum of said first and second data bit strings and a number of leading zeros or ones within said sum, wherein said sign of said sum is positive if said matching bit string corresponds to said first state output bit string and is negative if said matching bit string corresponds to said second state output bit string.

* * * * *